E. E. HAUER.
MOTOR.
APPLICATION FILED MAY 10, 1915.

1,167,997.

Patented Jan. 11, 1916.
2 SHEETS—SHEET 1.

Witnesses
Grover Ilgen.
Carl Seelenbinder

Inventor
Elmer E. Hauer
By Percy Norton
Attorney

E. E. HAUER.
MOTOR.
APPLICATION FILED MAY 10, 1915.
1,167,997.
Patented Jan. 11, 1916.
2 SHEETS—SHEET 2.
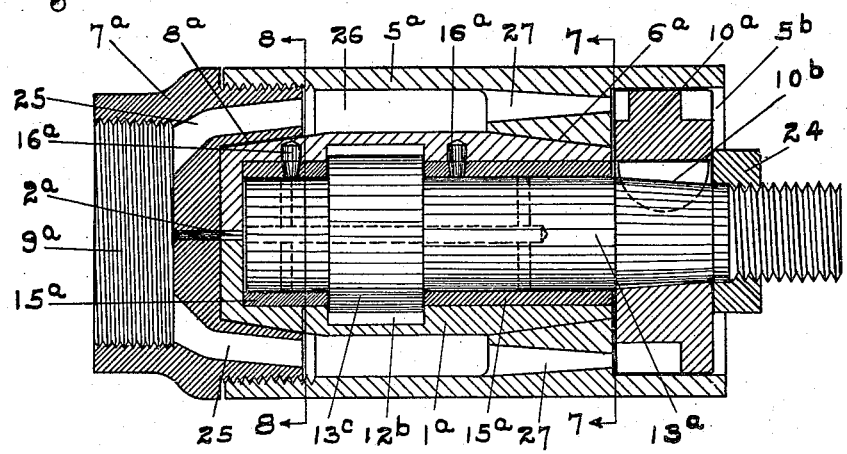
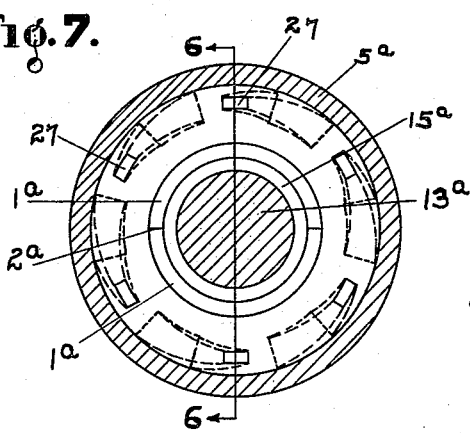
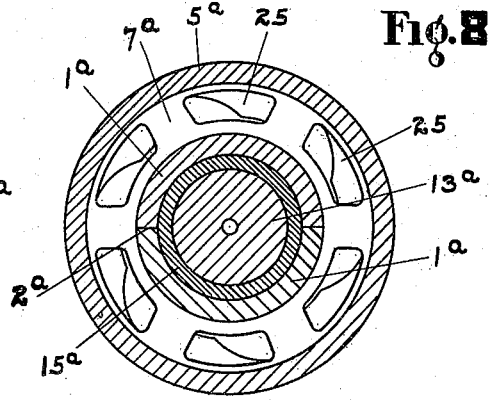

UNITED STATES PATENT OFFICE.

ELMER E. HAUER, OF SPRINGFIELD, OHIO, ASSIGNOR TO THE LAGONDA MANUFACTURING COMPANY, OF SPRINGFIELD, OHIO, A CORPORATION OF OHIO.

MOTOR.

1,167,997. Specification of Letters Patent. Patented Jan. 11, 1916.

Original application filed July 26, 1913, Serial No. 781,418. Divided and this application filed May 10, 1915. Serial No. 27,199.

*To all whom it may concern:*

Be it known that I, ELMER E. HAUER, a citizen of the United States, residing at Springfield, in the county of Clark and State of Ohio, have invented certain new and useful Improvements in Motors, of which the following is a specification, reference being had therein to the accompanying drawings.

My invention relates to motors and more particularly to motors for driving boiler tube cleaners that are adapted to travel through a tube with the cleaner although they may be used for other purposes.

The object of my invention is to provide simple, strong and efficient motors that will withstand the hard usage incident to the particular service for which they are designed and so arranged that they can be easily assembled and readily taken apart.

With these and other objects in view my invention consists of the constructions and combinations hereinafter described and set forth in the claims.

Figure 1:
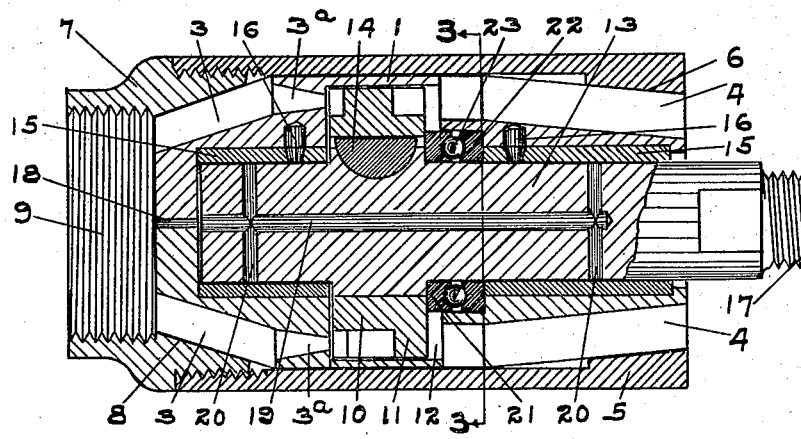
Figure 2:
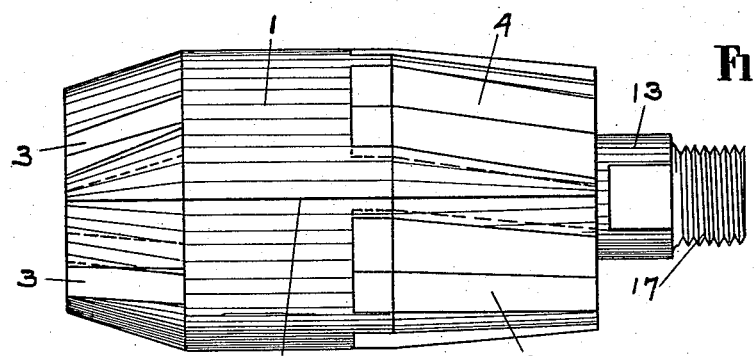
Figure 3:
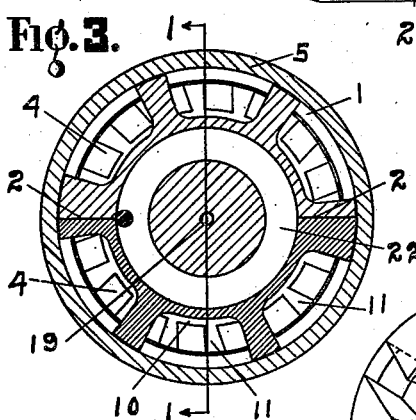
Figure 5:
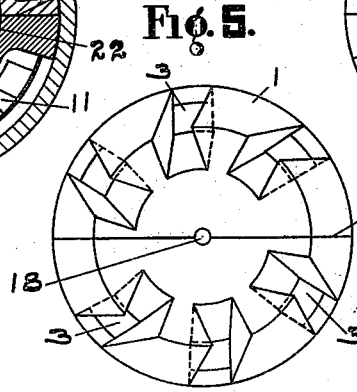
Figure 4:
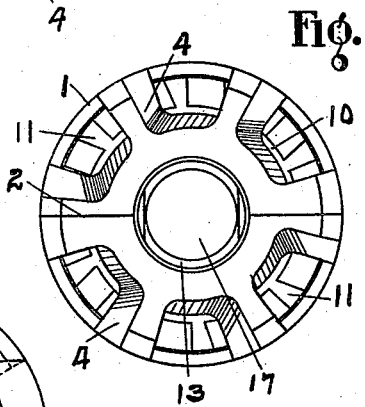

In the accompanying drawings which form a part of this specification Figure 1 is a longitudinal section of a motor embodying my invention taken on the line 1—1 of Fig. 3; Fig. 2 is an elevation of the holding member; Fig. 3 is a cross-section on the line 3—3 of Fig. 1; Fig. 4 is an end view looking into the discharge openings at the right of Fig. 2; Fig. 5 is an end view looking into the inlet openings at the left of Fig. 2; Fig. 6 is a longitudinal section of a modified form of the motor on the line 6—6 of Fig. 7; Fig. 7 is a cross-section on the line 7—7 of Fig. 6 and Fig. 8 is a cross-section on the line 8—8 of Fig. 6.

This is a division of my co-pending application, Serial Number 781,418, filed July 26, 1913.

Like numerals represent the same parts in the several views.

In the drawings a holding member 1 is split at 2 and is provided with inlet ways or ports 3 and $3^a$ and exhaust or discharge ways or ports 4. Said ports or ways are preferably inclined as shown. A casing 5 having inclined inner walls 6 to engage the inclined outer walls of the front end of the holding member is provided as a part thereof with a securing ring 7 having an inclined inner wall 8 to engage the inclined outer wall of the opposite end of said holding member and is screw-threaded to said casing to tighten and hold said holding member in place. Said casing forms the outer wall of said exhaust ports 4 and said securing ring forms the outer wall of the ports 3; and said securing ring is screw-threaded at 9 to attach a supply conduit.

A rotary motor member 10 which is shown in the form of a turbine having buckets 11 operates within a chamber 12 and is secured to a shaft 13 by a key 14. The shaft is journaled in bearings within the holding member on opposite sides of said chamber, said bearings being shown as having removable bushings 15 secured from rotation by dowel-pins 16. Said shaft extends through the front end of the holding member and is screw-threaded at 17 to attach the tool to be driven. An opening 18 through the wall of the holding member registers with a conduit 19 which intersects cross-conduits 20 opening to the journal bearings for the introduction of the motive agent to the bearings to act as a lubricant. A thrust bearing is provided in front of said rotary motor member, said bearing comprising a wearing plate or ring 21 on the shaft in front of said member and a like plate or ring 22 seated in a recess of the holding member, said plates or rings having grooves on their inner oppositely disposed sides forming race-ways for balls 23. The motor is assembled by first placing the rotary motor member. the thrust bearing and bushings on the shaft; then placing all said parts in the holding member and then inserting and securing the same within the casing by the screw-plug or ring.

In Figs. 6, 7 and 8 a modification is shown in which the holding member $1^a$ is split at $2^a$ and has a chamber $12^b$ with bearings on opposite sides thereof preferably provided with removable bushings $15^a$ secured against rotation by dowel-pins $16^a$. The rotary motor member $10^a$ within a recess or chamber $5^b$ of the casing $5^a$ is keyed to a cone-shaped portion $10^b$ of the shaft $13^a$ and is further secured by a nut 24. Said shaft has an enlarged portion $13^c$ within the chamber $12^b$ abutting the end walls thereof and the ends of the bushings $15^a$ form a thrust bearing to take the end thrust in both directions. Said shaft projects forwardly from the rotary motor member and is screw-threaded to attach the tool to be driven. The casing 5ᵃ has inclined inner walls 6ᵃ to engage the inclined outer walls of the front end of the holding member and is provided as a part thereof with a screw-ring or plug 7ᵃ having an inclined inner wall 8ᵃ to engage the inclined outer wall of the rear end of the holding member and is screw-threaded to said casing to tighten and hold said holding member in place. Said screw-ring or plug has a screw-threaded opening 9ᵃ to attach a supply conduit and is further provided with inlet ways or ports 25 opening into a chamber 26 formed by said casing and holding member and guide-ways or ports 27 lead from said chamber to the rotary motor member. It will be seen that the holding member carries the bearings at the respective ends thereof and gives a very rigid construction to withstand the lateral strains which are very great in the particular service for which the motor is designed; and further these bearings being within the holding member can be bored in perfect alinement at one operation.

Various modifications in the details of construction may be made without departing from the principle of my invention and I do not wish to be understood as limiting myself to the precise details hereinbefore described and shown in the drawings.

Having thus described my invention I claim—

1. In a rotary motor, a holding member separable by being split in the direction of its length and a casing for said holding member, substantially as described.

2. In a rotary motor, a holding member separable by being split in the direction of its length and having a chamber therein with bearings having removable bushings extending from opposite sides of said chamber and a casing for said holding member, substantially as described.

3. In a rotary motor, a holding member separable by being split in the direction of its length and having a chamber therein with bearings having removable bushings extending from opposite sides of said chamber, means to hold said bushings from rotation and a casing for said holding member, substantially as described.

4. In a rotary motor, a holding member separable by being split in the direction of its length and having a chamber therein with journal bearings extending from opposite sides thereof, means at an end of said chamber to take the wear and end thrust of the rotary motor member and a casing for said holding member, substantially as described.

5. In a rotary motor, a holding member separable by being split in the direction of its length and having a chamber therein with bearings extending from opposite sides of said chamber, bushings in said bearings with means to prevent their rotation, a wear and thrust plate at an end of said chamber and a casing to engage and secure said holding member in assembled position, substantially as described.

6. In a rotary motor, a holding member separable by being split in the direction of its length and having a bearing therein, a casing for said holding member, said holding member being tapered at its respective ends and said casing being adapted to engage and clamp said member in assembled position, substantially as described.

7. In a rotary motor, a holding member separable by being split in the direction of its length and having a chamber therein with bearings on opposite sides thereof, a rotary motor member having a shaft journaled in said bearings, one end of said shaft projecting beyond said holding member and adapted to attach the tool to be driven and a casing adapted to engage and secure said holding member in assembled position, substantially as described.

8. In a rotary motor, a holding member separable by being split in the direction of its length and having a chamber therein with bearings on opposite sides thereof, a rotary motor member journaled in said bearings, means at an end of said rotary motor to take the wear and thrust thereof, a casing adapted to engage and secure said holding member in assembled position and means to introduce the motive agent at one end of said motor and discharge it from the opposite end, substantially as described.

In testimony whereof I have hereunto affixed my signature in the presence of two witnesses.

ELMER E. HAUER.

Witnesses:
OLIVER H. HAUSE,
V. H. BAKER.

Copies of this patent may be obtained for five cents each, by addressing the "Commissioner of Patents, Washington, D. C."